(12) United States Patent
Holz

(10) Patent No.: US 10,281,553 B2
(45) Date of Patent: May 7, 2019

(54) DETERMINING THE ORIENTATION OF OBJECTS IN SPACE

(71) Applicant: Leap Motion, Inc., San Francisco, CA (US)

(72) Inventor: David Holz, San Francisco, CA (US)

(73) Assignee: Leap Motion, Inc., San Francisco, CA (US)

( * ) Notice: Subject to any disclaimer, the term of this patent is extended or adjusted under 35 U.S.C. 154(b) by 426 days.

(21) Appl. No.: 14/094,645

(22) Filed: Dec. 2, 2013

(65) Prior Publication Data
US 2014/0267774 A1 Sep. 18, 2014

Related U.S. Application Data

(60) Provisional application No. 61/791,026, filed on Mar. 15, 2013.

(51) Int. Cl.
*G06T 7/70* (2017.01)
*G01S 3/786* (2006.01)
*G01S 17/46* (2006.01)

(52) U.S. Cl.
CPC .............. *G01S 3/7864* (2013.01); *G06T 7/70* (2017.01); *G01S 17/46* (2013.01)

(58) Field of Classification Search
CPC ....................................................... G06T 7/004
See application file for complete search history.

(56) References Cited

U.S. PATENT DOCUMENTS 4,708,483 A * 11/1987 Lorenz ................... G01B 11/26
356/3.07
6,320,979 B1 11/2001 Melen
(Continued)

FOREIGN PATENT DOCUMENTS

EP 0342251 A1 11/1989
EP 0403399 A2 12/1990

OTHER PUBLICATIONS

International Search Report and Written Opinion from corresponding International application No. PCT/US2014/023675; dated Jul. 18, 2014; 20 pgs.
(Continued)

*Primary Examiner* — Dave Czekaj
*Assistant Examiner* — Berteau Joisil
(74) *Attorney, Agent, or Firm* — Haynes Beffel & Wolfeld LLP; Ernest J. Beffel, Jr.

(57) ABSTRACT

A method and system determines object orientation using a light source to create a shadow line extending from the light source. A camera captures an image including the shadow line on an object surface. An orientation module determines the surface orientation from the shadow line. In some examples a transparency imperfection in a window through which a camera receives light can be detected and a message sent to a user as to the presence of a light-blocking or light-distorting substance or particle. A system can control illumination while imaging an object in space using a light source mounted to a support structure so a camera captures an image of the illuminated object. Direct illumination of the camera by light from the light source can be prevented such as by blocking the light or using a light-transmissive window adjacent the camera to reject light transmitted directly from the light source.

24 Claims, 9 Drawing Sheets

(56) References Cited

U.S. PATENT DOCUMENTS

| | | |
|---|---|---|
| 8,638,989 B2 | 1/2014 | Holz |
| 2003/0071194 A1* | 4/2003 | Mueller ................. G01B 11/00 |
| | | 250/208.1 |
| 2004/0212725 A1* | 10/2004 | Raskar .................... G06T 15/02 |
| | | 348/370 |
| 2011/0292179 A1 | 12/2011 | Hernandez et al. |
| 2013/0182079 A1* | 7/2013 | Holz ....................... G06T 7/593 |
| | | 348/47 |
| 2014/0125775 A1* | 5/2014 | Holz ................. H04N 13/0217 |
| | | 348/49 |

OTHER PUBLICATIONS

U.S. Appl. No. 61/724,091, filed Nov. 8, 2012, entitled Systems and Methods for Capturing Motion in Three-Dimensional Space.

* cited by examiner

DETERMINING THE ORIENTATION OF OBJECTS IN SPACE

BACKGROUND

The present invention relates generally to systems and methods for locating objects in three-dimensional space, and more specifically to determining the position and orientation of objects.

Images captured by a digital camera may be used to locate an object in the three-dimensional space viewed by the camera. In existing systems, image-processing algorithms may be applied to the images in an attempt to discern objects therein; for example, an edge-detection algorithm may be applied to attempt to locate the edges of objects in the image. The detected edges may be applied to identify the objects defined by the detected edges. These types of systems, however, tend to require substantial computational capacity and/or processing time to analyze the images, rely on being able to identify the object, and may lack of the precision to accurately determine the orientation of the objects. If the object is not found in the image, if a detected object is not recognized, or if the object comprises surfaces that are difficult to capture, these existing systems are unable to determine object properties with any accuracy or are unable to determine the properties at all. A need therefore exists for a system and method for quickly and accurately determining properties of objects in space.

SUMMARY

Aspects of the systems and methods described herein provide for determining positional information (e.g., location, and/or orientation) for at least a portion of a target object within a field of view. Among other aspects, embodiments can enable objects and/or features of an object surface to be automatically (e.g. programmatically) determined using positional information in conjunction with receiving input, commands, communications and/or other user-machine interfacing, gathering information about objects, events and/or actions existing or occurring within an area being explored, monitored, or controlled, and/or combinations thereof.

In various embodiments, systems and methods are provided for determining characteristics for properties (e.g., positional information such as location, orientation, Kercher etc.) of an object in space by causing a shadow line formed by an instruction between the object and a light source to fall onto at least a portion of the object. The shadow line falls across at least a portion of an object, and an image system captures an image of the object portion and the shadow line. By determining properties (e.g., Kercher, the position, ankle, extent, etc.) of the shadow line as captured, the one or more characteristics of the object are found.

A method for determining an orientation of an object in space can be carried out as follows. A light source is operated to create a shadow line extending from the light source. An image is captured using a camera, the image including an object intersecting the shadow line. The image is analyzed to determine a position of the shadow line on the object. An orientation of the object is determined based at least in part on the position of the shadow line. The orientation determining method can include one or more the following. The shadow line can be created by blocking a portion of light emitted by the light source with a light blocking structure at least partially opaque to the light. The orientation of the light blocking structure can also be based on a configuration and position of the light blocking structure relative to the light source. Analyzing the image can include analyzing rows of the image to detect increases or decreases in luminescence therein. The method can include one or more the following: moving the shadow line by moving the light source or the light blocking structure; detecting a light-blocking or light-distorting substance or particle on a transparent window through which the camera receives light; and preventing direct illumination of the camera by light from the light source.

A system for determining an orientation of an object in space includes the following. A light source emits light. A light blocking structure is positioned and configured so that a portion of the light emitted from the light source is blocked to create a shadow line extending from the light source. A camera captures an image including the shadow line on a surface of an object. An orientation module determines an orientation of the surface based on the shadow line on the surface. The orientation determining system can include one or more the following. The light blocking structure can be a portion of a structure housing the light source; the structure housing the light source can include a protrusion acting as the light blocking structure, or a recess in the structure housing the light source, the recess the having a wall acting as the light blocking structure.

A light blocking/distorting detection method, for use with a system using at least one camera to image an object in space, is carried out as follows. An object in space is illuminated. An image of at least a portion of the object is captured using a camera. A light-blocking or light-distorting substance or particle on a transparent window through which the camera receives light is detected. A message is sent to a user to inform the user of the presence of said light-blocking or light-distorting substance or particle. The light blocking/distorting detection method can include one or more the following. Detecting the substance or particle can include comparing the image with a second image taken with a second said camera. The object illuminating step can include operating a light source which projects light towards the object, and detecting the substance or particle can include comparing the image with a second image taken with the camera while the light source is not projecting light.

A first method for detecting a transparency imperfection in a window through which a camera receives light, is carried out as follows. A first image is captured with the camera. A second image is captured with a second camera. The first image is compared to the second image to detect a blurry region in the first image corresponding to transparency imperfection in a window through which the first camera receives light. In some examples the first transparency imperfection detection method can include one or more the following. The transparency imperfection can be a light-blocking or light-distorting substance or particle. In some examples a user can be alerted to the presence of the substance or particle.

A second method for detecting a transparency imperfection in a window through which a camera receives light, is carried out as follows. A first image is captured with the camera while a light source near the camera is emitting light. A second image is captured with the camera while the light source is not emitting light. The first image is compared to the second image to detect an illumination of a transparency imperfection in the window through which the first camera receives light. The transparency imperfection can be a light-blocking or light-distorting substance or particle. In some examples the method includes alerting a user to the presence of the transparency imperfection.

A method for controlling illumination while imaging an object in space, is carried out as follows. A light source is operated to emit light from the light source. An image of an object is captured using a camera, the image being at least partially illuminated by the light. Direct illumination of the camera by light from the light source is prevented. Examples of the illumination controlling method can include one or more the following. The light capture preventing step can include the shielding the camera with a light-transmissive window adjacent to the camera, the window configured to reject light transmitted directly from the light source to the window. The light capture preventing step can include blocking a portion of the light emitted by the light source with a light blocking structure adjacent to the light source, the light blocking structure being at least partially opaque to the light. The light source operating step and the image capturing step can be carried out with the light source and the camera mounted to a common support structure with the common support structure including the light blocking structure.

A system for controlling illumination while imaging an object in space includes the following. A light source is mounted to a support structure to emit light to illuminate an object. A camera is used to capture an image of the illuminated object. A light blocking structure is positioned and configured to prevent light transmitted from the light source from directly illuminating the camera.

Advantageously, these and other aspects enable machines, computers and/or other types of intelligent devices, and/or other types of automata to obtain information about objects, events, actions, and/or users employing gestures, signals, and/or other motions conveying meaning and/or combinations thereof. For example, some embodiments can provide for detecting of curvatures, or other complexities in the object. Various embodiments can provide for reducing stray luminance from a source being detected by a detector. Some embodiments can provide for efficient automatic determination that dirt or other contaminants exist on a lens or other optical surface of the device performing imaging. These and other advantages and features of the embodiments herein described, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which:

FIG. 8A shows emitted light reflected from a window due to, for example, total-internal reflection. FIG. 8B shows a protrusion which prevents the light from striking a window. FIG. 8C shows a protrusion overhanging a portion of the light source.

DETAILED DESCRIPTION

Described herein are various embodiments of methods and systems for determining the position and/or orientation of an object in space. Embodiments can provide improved accuracy in positional and/or orientation information capable of supporting object or object surface recognition, object change, event or action recognition and/or combinations thereof. An embodiment provides for determining position and/or orientation of target object(s) in conjunction with a motion-capture. In one embodiment there can be provided a camera to acquire images of an object; and a computer and/or other logic implementing hardware to identify and characterize object(s) based at least in part upon the image. Optionally, a computer display and/or other types of display hardware, software and/or combinations thereof, can be provided to display information related to the identified/characterized object. A light source may also be included to illuminate the object.

Figure 1:
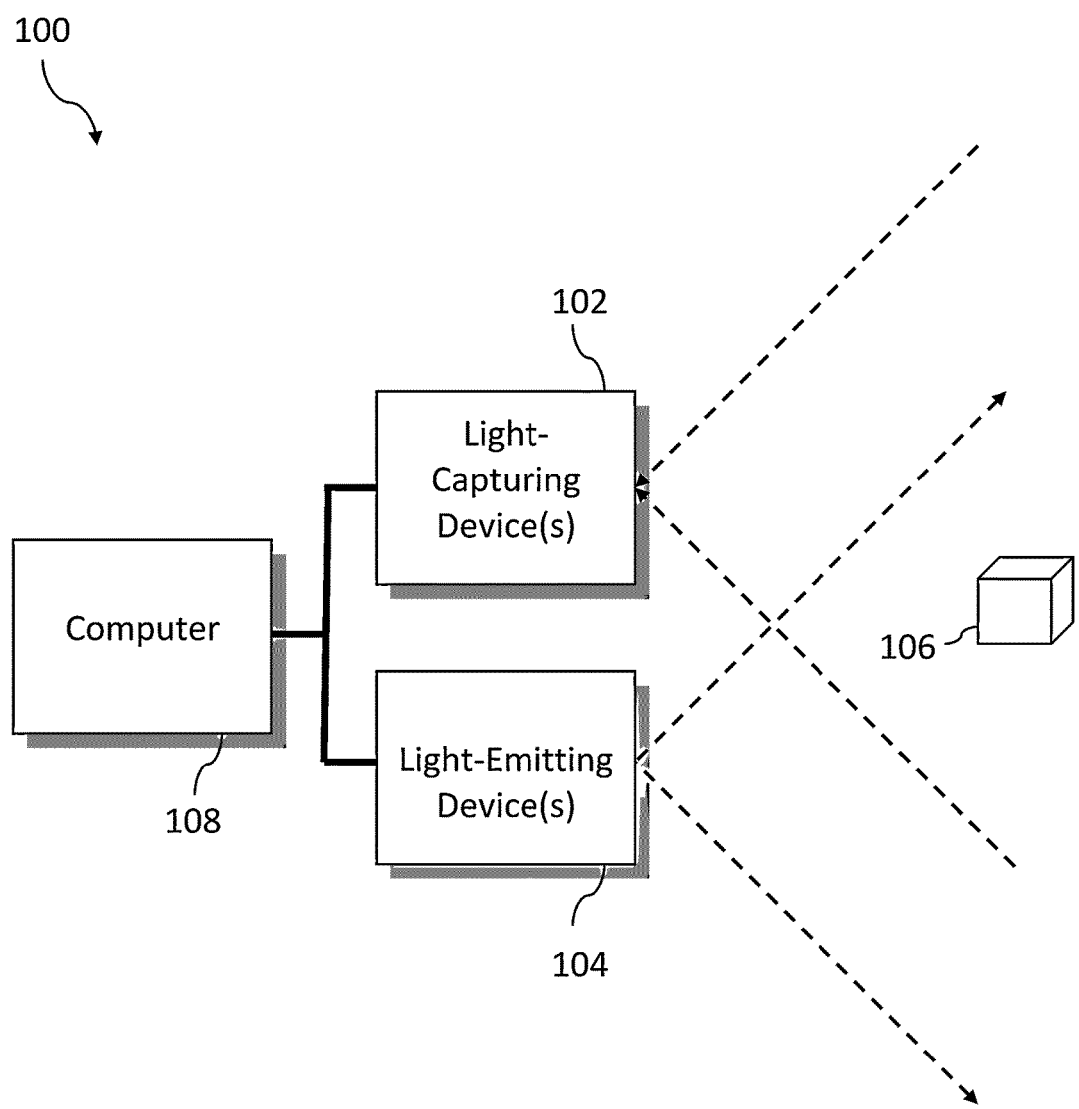
FIG. 1 illustrates an exemplary image-capture system in accordance with embodiments of the present invention.

Motion-capture systems generally include (i) a camera for acquiring images of an object; (ii) a computer for processing the images to identify and characterize the object; and (iii) a computer display for displaying information related to the identified/characterized object. A light source may also be included to illuminate the object. FIG. 1 illustrates an exemplary motion-capture system 100. The system 100 includes one or more light-capturing devices 102 (e.g., digital cameras or similar devices), generally referred to as cameras 102, each including an image sensor (e.g., a CCD or CMOS sensor), an associated imaging optic (e.g., a lens), and a window of transparent material protecting the lens from the environment. In embodiments having a plurality of cameras, two or more cameras 102 may be arranged such that their fields of view overlap in a viewed region. One or more light-emitting devices 104 may be used to illuminate an object 106 in the field of view. The cameras 102 provide digital image data to a computer 108, which analyzes the image data to determine the 3D position, orientation, and/or motion of the object 106 the field of view of the cameras 102.

The cameras 102 may be, e.g., visible-light cameras, infrared (IR) cameras, ultraviolet cameras, or cameras operating in any other electromagnetic frequency regime. Preferably, the cameras 102 are capable of capturing video images (i.e., successive image frames at a constant rate of, say, fifteen frames per second, although no particular frame rate is required). The particular capabilities of cameras 102 may vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be a cube of one meter in length. To capture motion of a running person, the volume of interest might have dimensions of tens of meters in order to observe several strides.

The cameras may be oriented in any convenient manner. In one embodiment, the optical axes of the cameras 102 are parallel, but this is not required. As described below, each camera 102 may be used to define a "vantage point" from which the object 106 is seen; if the location and view direction associated with each vantage point are known, the locus of points in space that project onto a particular position in the camera's image plane may be determined. In some embodiments, motion capture is reliable only for objects in an area where the fields of view of cameras 102; the cameras 102 may be arranged to provide overlapping fields of view throughout the area where motion of interest is expected to occur. In other embodiments, the system 100 may include one or more light sources 104, and the cameras 102 measure the reflection of the light emitted by the light sources on objects 106. The system may include, for example, two cameras 102 and one light source 104; one camera 102 and two light sources 104; or any other appropriate combination of light sources 104 and cameras 102.

Figure 2:
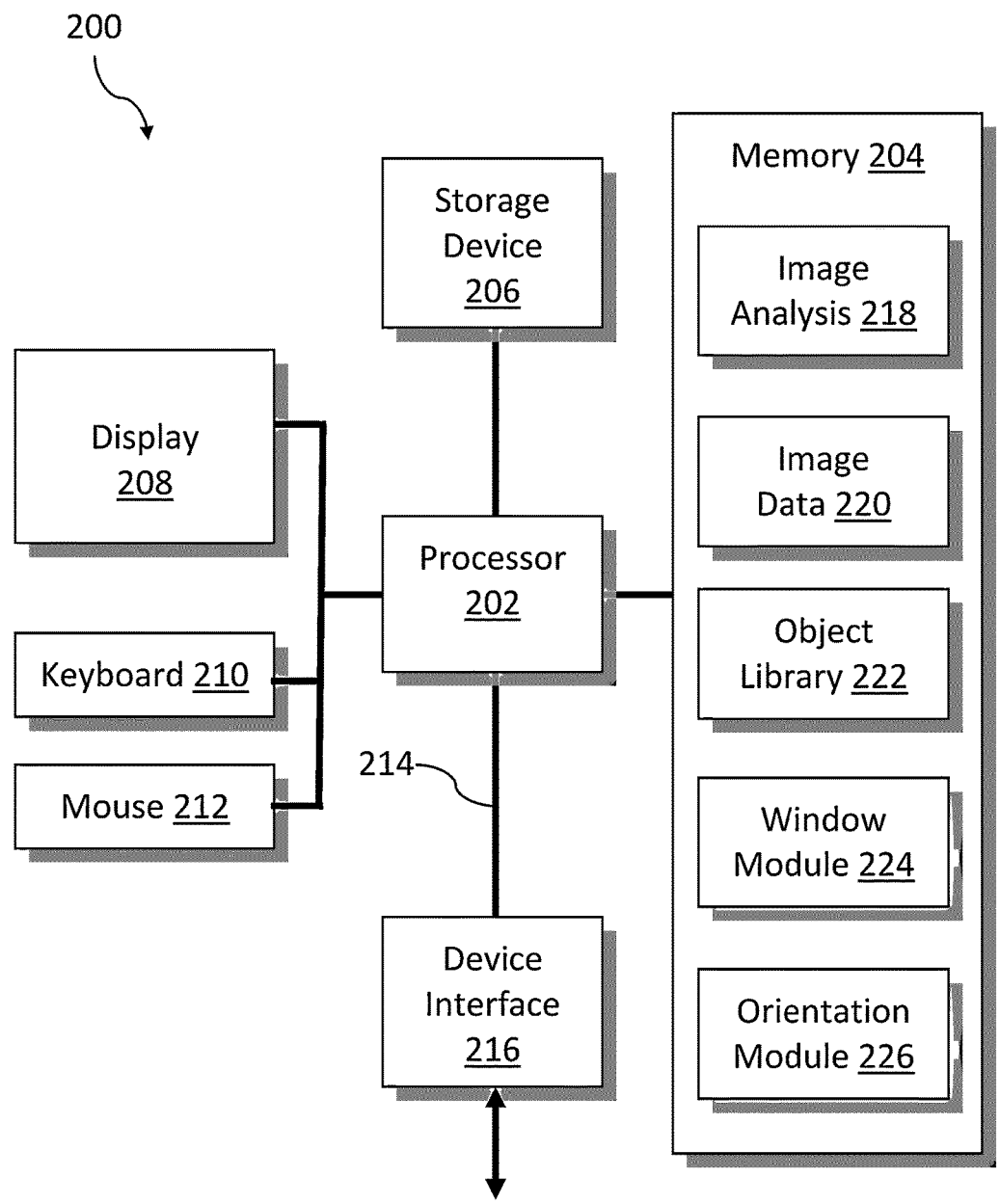
FIG. 2 illustrates an exemplary computer system for image processing, analysis, and display in accordance with embodiments of the present invention.

Computer 108 may generally be any device or combination of devices capable of processing image data using techniques described herein. FIG. 2 is a simplified block diagram of a suitably programmed general-purpose computer 200 implementing the computer 108 according to an exemplary embodiment of the present invention. The computer 200 includes a processor 202 with one or more central processing units (CPUs), volatile and/or non-volatile main memory 204 (e.g., RAM, ROM, or flash memory), one or more mass storage devices 206 (e.g., hard disks, or removable media such as CDs, DVDs, USB flash drives, etc. and associated media drivers), a display device 208 (e.g., a liquid crystal display (LCD) monitor), user input devices such as keyboard 210 and mouse 212, and one or more buses 214 (e.g., a single system bus shared between all components, or separate memory and peripheral buses) that facilitate communication between these components.

The cameras 102 and/or light sources 104 may connect to the computer 200 via a universal serial bus (USB), FireWire, or other cable, or wirelessly via Bluetooth, Wi-Fi, etc. The computer 200 may include a camera interface 216, implemented in hardware (e.g., as part of a USB port) and/or software (e.g., executed by processor 202), that enables communication with the cameras 102 and/or light sources 104. The camera interface 216 may include one or more data ports and associated image buffers for receiving the image frames from the cameras 102; hardware and/or software signal processors to modify the image data (e.g., to reduce noise or reformat data) prior to providing it as input to a motion-capture or other image-processing program; and/or control signal ports for transmit signals to the cameras 102, e.g., to activate or deactivate the cameras, to control camera settings (frame rate, image quality, sensitivity, etc.), or the like.

The main memory 204 may be used to store instructions to be executed by the processor 202, conceptually illustrated as a group of modules. These modules generally include an operating system (e.g., a Microsoft WINDOWS, Linux, or APPLE OS X operating system) that directs the execution of low-level, basic system functions (such as memory allocation, file management, and the operation of mass storage devices), as well as higher-level software applications such as, e.g., a motion-capture (mocap) program 218 for analyzing the camera images to track the position of an object of interest and/or a motion-response program for computing a series of output images (or another kind of response) based on the tracked motion. Suitable algorithms for motion-capture program are described further below as well as, in more detail, in U.S. patent application Ser. No. 13/414,485, filed on Mar. 7, 2012 and Ser. No. 13/742,953, filed on Jan. 16, 2013, and U.S. Provisional Patent Application No. 61/724,091, filed on Nov. 8, 2012, which are hereby incorporated herein by reference in their entirety. The various modules may be programmed in any suitable programming language, including, without limitation high-level languages such as C, C++, C#, OpenGL, Ada, Basic, Cobra, Fortran, Java, Lisp, Perl, Python, Ruby, or Object Pascal, or low-level assembly languages.

The memory 204 may further store input and/or output data associated with execution of the instructions (including, e.g., input and output image data 220) as well as additional information used by the various software applications; for example, in some embodiments, the memory 204 stores an object library 222 of canonical models of various objects of interest. As described below, an object detected in the camera images may identified by matching its shape to a model in the object library 222, and the model may then inform further image analysis, motion prediction, etc.

In various embodiments, the motion captured in a series of camera images is used to compute a corresponding series of output images for display on the computer screen 208. For example, camera images of a moving hand may be translated into a wire-frame or other graphic depiction of the hand by the processor 202. Alternatively, hand gestures may be interpreted as input used to control a separate visual output; by way of illustration, a user may be able to use upward or downward swiping gestures to "scroll" a webpage or other document currently displayed, or open and close her hand to zoom in and out of the page. In any case, the output images are generally stored in the form of pixel data in a frame buffer, which may, but need not be, implemented in main memory 204. A video display controller reads out the frame buffer to generate a data stream and associated control signals to output the images to the display 208. The video display controller may be provided along with the processor 202 and memory 204 on-board the motherboard of the computer 200, and may be integrated with the processor 202 or implemented as a co-processor that manipulates a separate video memory. In some embodiments, the computer 200 is equipped with a separate graphics or video card that aids with generating the feed of output images for the display 208. The video card generally includes a graphical processing unit ("GPU") and video memory, and is useful, in particular, for complex and computationally expensive image processing and rendering. The graphics card may implement the frame buffer and the functionality of the video display controller (and the on-board video display controller may be disabled). In general, the image-processing and motion-capture functionality of the system may be distributed between the GPU and the main processor 202 in various conventional ways that are well characterized in the art.

The computer 200 is an illustrative example; variations and modifications are possible. Computers may be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some embodiments, one or more cameras may be built into the computer rather than being supplied as separate components. Further, the computer processor may be a general-purpose microprocessor, but depending on implementation can alternatively be, e.g., a microcontroller, peripheral integrated circuit element, a customer-specific integrated circuit ("CSIC"), an application-specific integrated circuit ("ASIC"), a logic circuit, a digital signal processor ("DSP"), a programmable logic device such as a field-programmable gate array ("FPGA"), a programmable logic device ("PLD"), a programmable logic array ("PLA"), smart chip, or other device or arrangement of devices.

Further, while computer 200 is described herein with reference to particular blocks, this is not intended to limit the invention to a particular physical arrangement of distinct component parts. For example, in some embodiments, the cameras 102 are connected to or integrated with a special-purpose processing unit that, in turn, communicates with a general-purpose computer, e.g., via direct memory access ("DMA"). The processing unit may include one or more image buffers for storing the image data read out from the camera sensors, a GPU or other processor and associated memory implementing at least part of the motion-capture algorithm, and a DMA controller. The processing unit may provide processed images or other data derived from the camera images to the computer for further processing. In some embodiments, the processing unit sends display control signals generated based on the captured motion (e.g., of a user's hand) to the computer, and the computer uses these control signals to adjust the on-screen display of documents and images that are otherwise unrelated to the camera images (e.g., text documents or maps) by, for example, shifting or rotating the images.

Figure 3A:
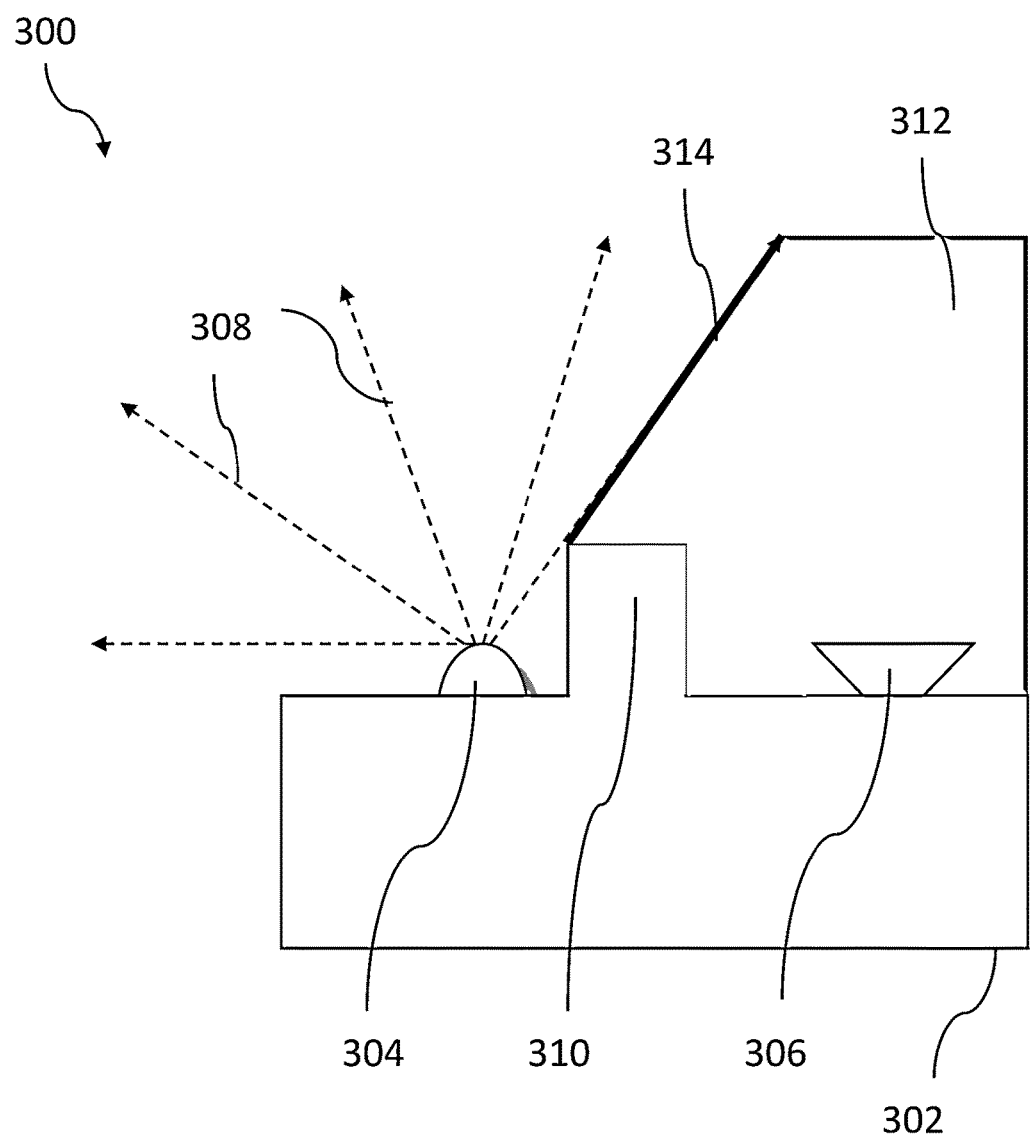
FIGS. 3A and 3B illustrate cross-sectional views of light transmitters and receivers in accordance with embodiments of the present invention.

In one embodiment, the system 100 casts a shadow on a surface, captures images that include the display of the shadow on the surface, and analyzes the images to determine an orientation and/or position of the surface. FIG. 3A illustrates a cross-section view 300 of an embodiment of an image-capture and light-source device 302. The device 302 includes at least one light source 304 and at least one camera 306. The light source 304 emits light rays 308; an opaque protrusion 310 from the device 302 blocks a portion of the light rays 308 from reaching a region 312. The position of the protrusion 310 relative to the light source 304 thus creates a shadow line 314 that separates the darkened region 312 from the region illuminated by the light rays 308. In one embodiment, the protrusion 310 is sized and placed on the device 300 to prevent light emitted from the light source 304 from directly striking the camera 304. In other embodiments, the protrusion 310 is sized and placed to create the shadow line 314 in addition to, or instead of, protecting the camera 304.

Figure 3B:
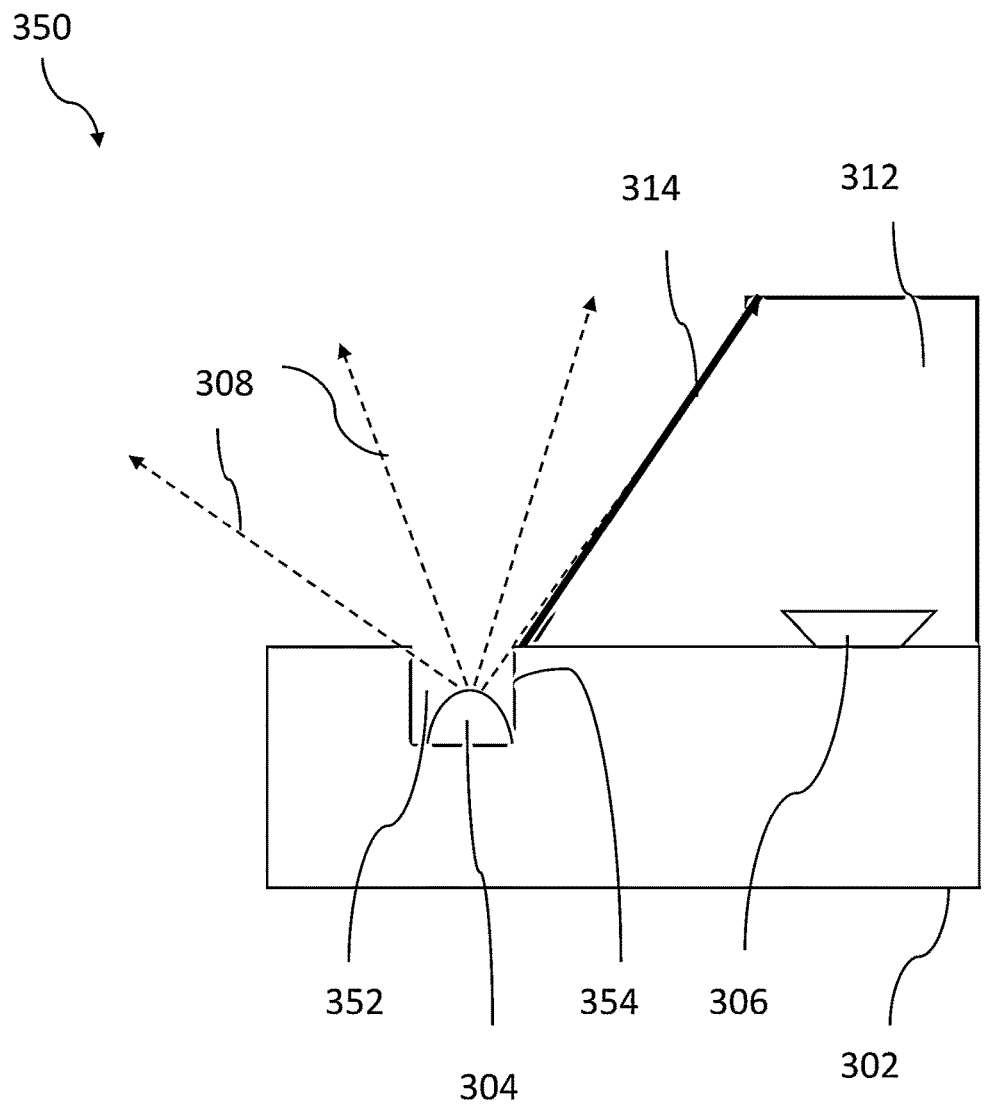

Another example of a system 350 for casting a shadow line 314 appears in cross-section in FIG. 3B. In this embodiment, the light source 304 is disposed within a recess 352 within the device 302, and the shadow line 314 is created by an opaque sidewall 354 of recess 352 of the device 302. In general, any opaque structure positioned near the light source 304 may be used to create the shadow line 314, and the current invention is not limited to only the embodiments depicted in FIGS. 3A and 3B.

Figure 4:
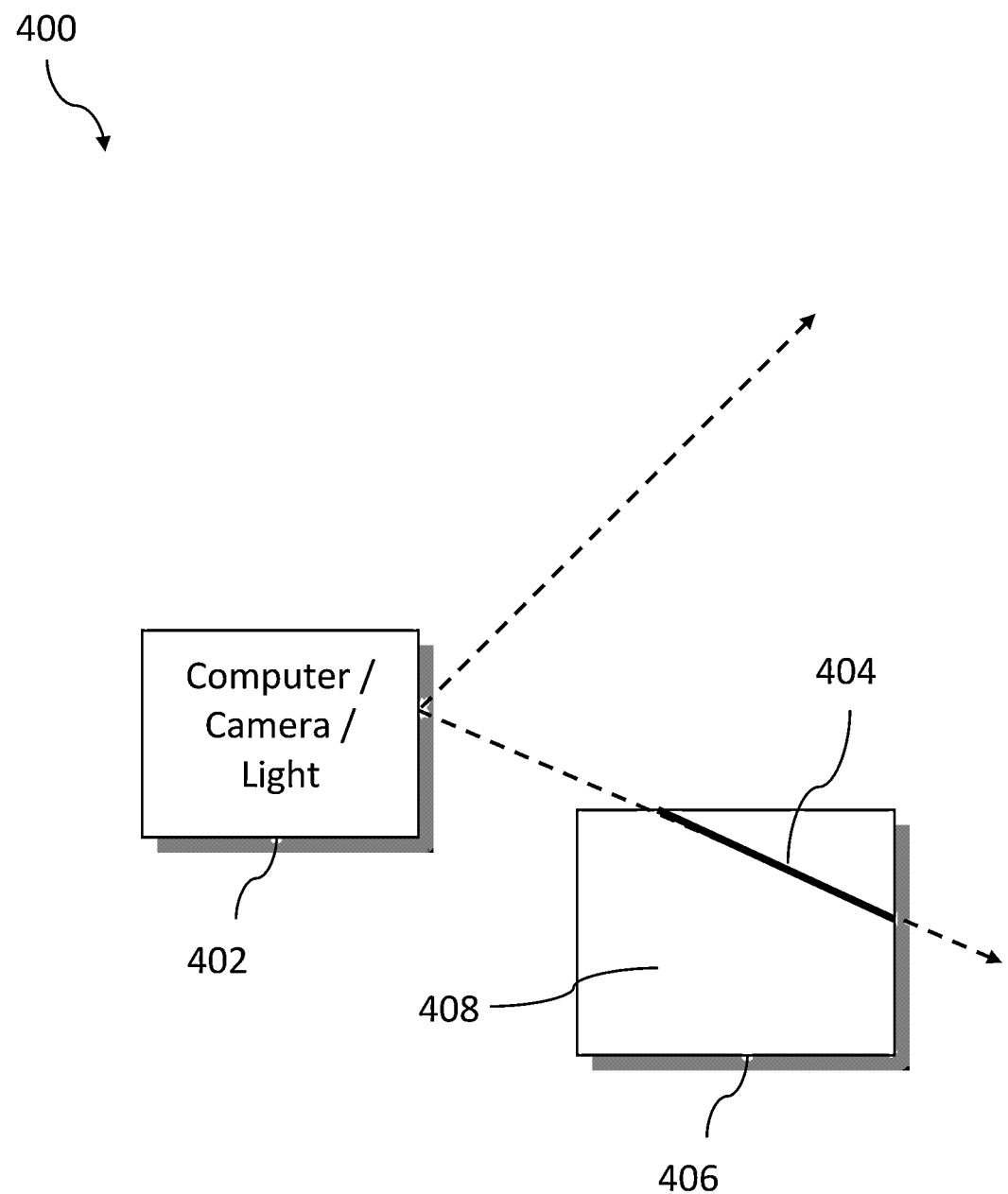
FIG. 4 illustrates a block diagram of a system for casting a shadow line on an object in accordance with embodiments of the present invention.

FIG. 4 is a block diagram 400 of a system 402 that includes a computer, camera, and light source in accordance with the embodiments of the invention discusses above (such as, for example, the system 100 illustrated in FIG. 1). An opaque structure disposed proximate the light source causes a shadow line 404 to be cast by the light source. The shadow line 404 intersects an object 406 having a surface 408. The camera captures one or more images of the surface 408 of the object 406, and the computer analyzes the image(s) to extract the position of the shadow line 404 therein. In various embodiments, the computer runs an edge-detection (or similar) algorithm on the image(s) to detect the position of the shadow line 404 and/or analyzes rows, or groups of rows, of the image(s) to detect increases or decreases in luminescence of the pixels in each row. With reference to FIG. 2, the device interface 216 may receive the image data from the camera, and the memory 204 may store in as image data 220. An orientation module 226 analyzes the image data 220 to determine the location and position of the shadow line 404; any objects intersecting the shadow line may be identified (using, for example, the object library 222). The orientation module 226 may then determine the orientation of the objects.

In one embodiment, a candidate line is found in an image; the computer determines if the candidate line is the shadow line 404 by searching for the candidate line elsewhere in the image. If a surface 408 of an object 406 is found, for example, and the candidate line does not bisect the entire surface (or otherwise ends unexpectedly), the candidate line may be deemed to not be the shadow line 404. The computer may, in addition, analyze additional images taken at different points in time by the camera to search for the shadow line 404. In some embodiments, the position of the light source and/or opaque structure casting the shadow line 404 may be altered in accordance with commands from the computer; if no suitable shadow line 404 may be found, the computer may cause it to move to a new position and search again. The position of the shadow line 404 on the object 406 may further be predicted by the position of the shadow line 404 on other objects in the field of view of the camera. Shadow line 404 need not be a straight line. In some examples system 402 can be constructed to provide improved surface feature capture capability by casting illumination according to a reference pattern on object 406. Such structured light patterns could be, for example, in the form of an array of circles with the edges of the circles creating shadow lines 404.

Figure 5A:
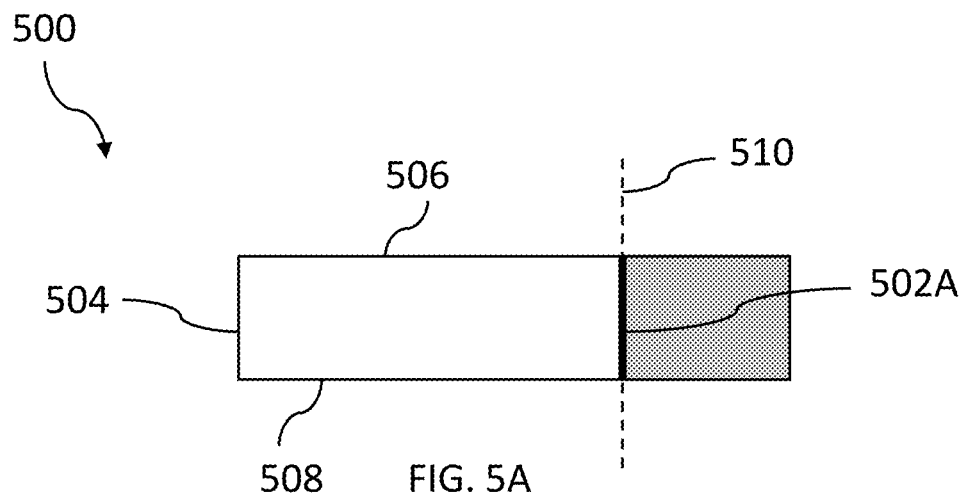
FIGS. 5A, 5B and 5C illustrate exemplary orientations of an object and shadow lines thereon in accordance with embodiments of the present invention.
Figure 5B:
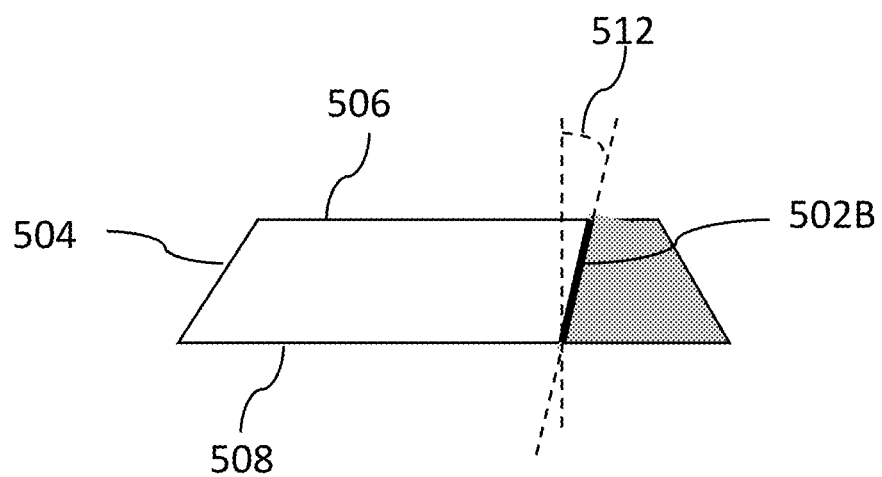
Figure 5C:
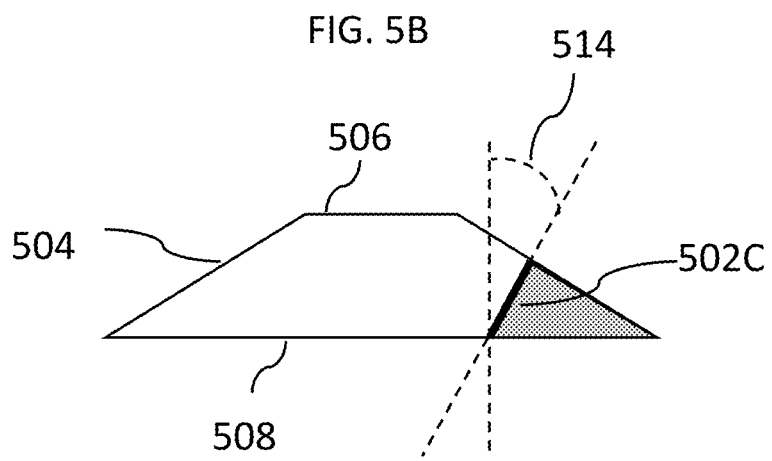

FIGS. 5A-5C illustrate examples of the relationship of the position of shadow lines 502A, 502B, 502C and the orientation of an object 504. In FIG. 5A, the object 504 is oriented such that its top edge 506 and bottom edge 508 are equidistant from a light-transmitting device casting the shadow line 502A (e.g., the device 402 illustrated in FIG. 4). In this example, the shadow line 502A coincides with a reference line 510. The position of the shadow line 502A changes, however, as the orientation of the object 504 changes. In FIG. 5B, the top edge 506 of the object 504 has moved further away from the light-transmitting device; as a result, the shadow line 502B correspondingly moves, now positioned such that it lies at an angle 512 with respect to the reference line 510. As the top edge 506 of the object 504 moves further away, as shown in FIG. 5C, the angle 514 that the new shadow line 502C makes with the reference line 510 increases further.

Figure 6:
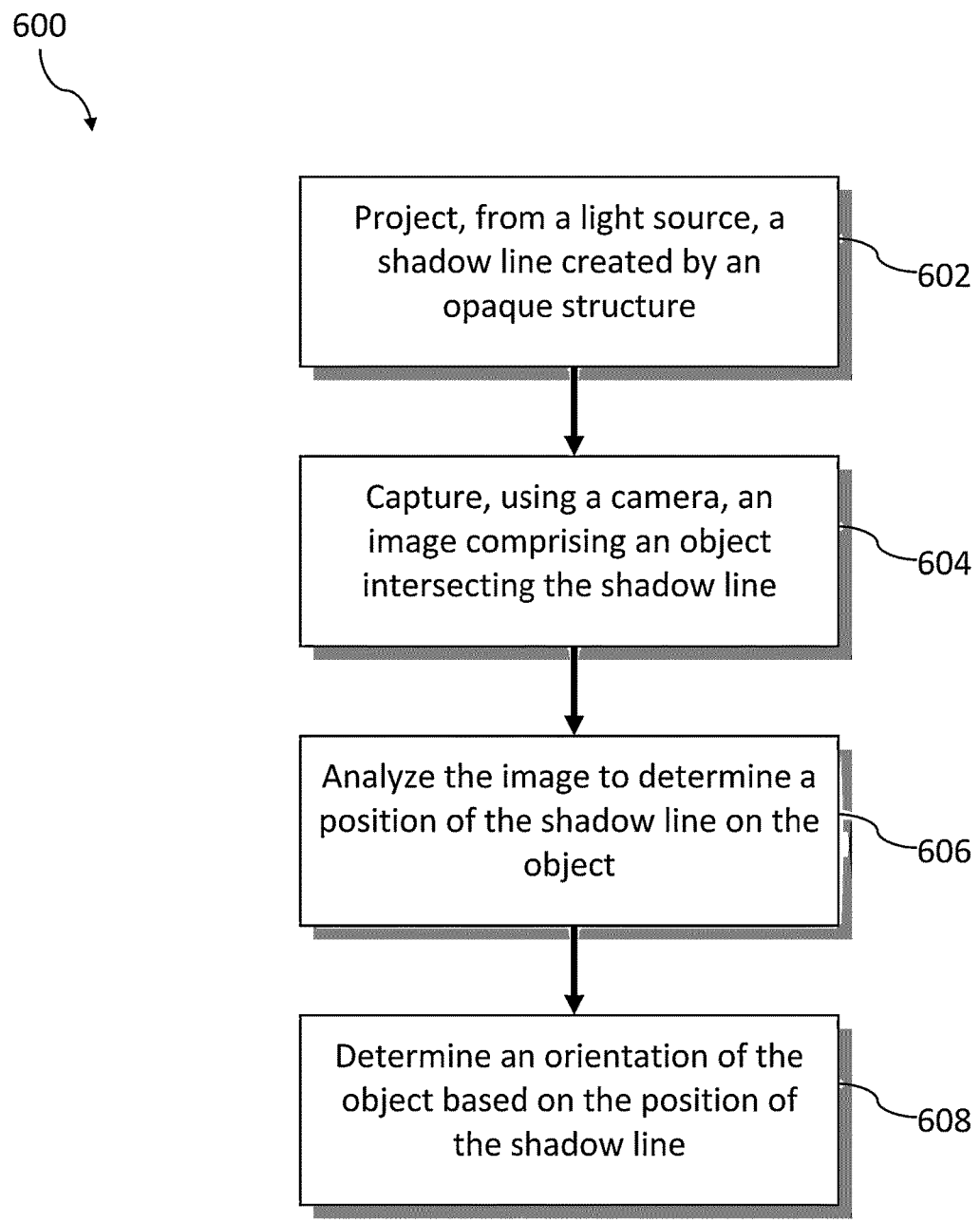
FIG. 6 illustrates a flowchart describing a method for determining an orientation of an object in space in accordance with embodiments of the present invention.

Thus, by analyzing the position of the shadow line, the orientation of the object 504 may be determined. FIG. 6 illustrates a flowchart 600 for determining the orientation of an object in accordance with an embodiment of the present invention. In a first step 602, light is project from a light source (e.g., the light source 304 depicted in FIG. 3A) and a shadow line is created therein by an opaque structure (e.g., the protrusion 310). In a second step 604, an image is captured by a camera; in one embodiment, the image comprises an object that intersects the shadow line (i.e., the shadow line falls on a surface of the object). In a third step 606, the image is analyzed to determine the position of the shadow line on the object; in a fourth step 608, an orientation of the object (specifically, a surface of the object) is determined based on the position of the shadow line.

Figure 7:
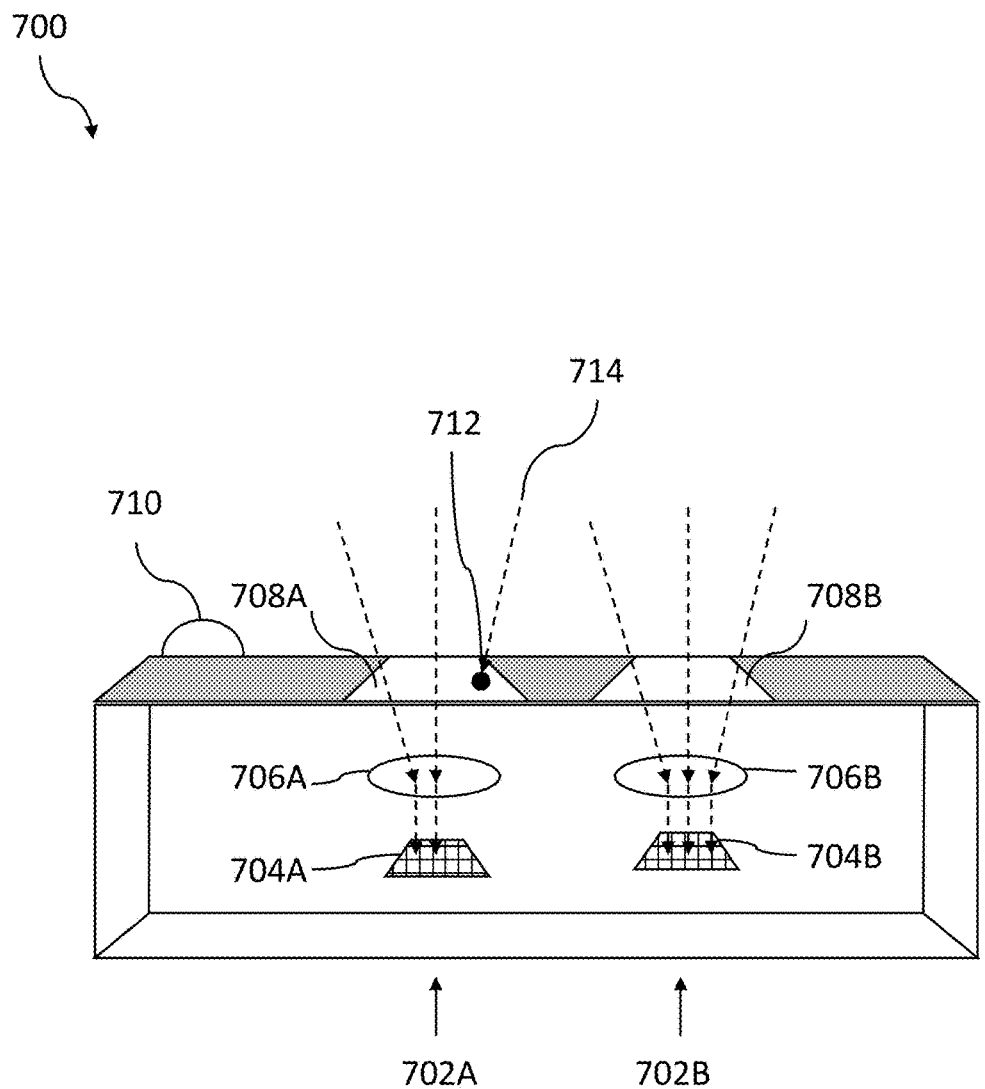
FIG. 7 illustrates a light transmitting and receiving device in accordance with embodiments of the present invention.

In one embodiment, the camera (e.g., the light-capturing device 102 illustrated in FIG. 1) includes a charge-coupled device ("CCD") or other semiconductor device for receiving and detecting light, a lens for focusing incoming light on the CCD, and a transparent window for protecting the lens from the environment. An example of a device 700 that includes two such cameras 702A, 702B appears in FIG. 7; each camera 702A, 702B includes a CCD 704A, 704B, a lens 706A, 706B, and a window 708A, 708B. In one embodiment, the device 700 further includes a light source 710. The thickness of the windows 708A, 708B may be selected to reduce or eliminate the amount of light emitted by the light source 710 that is transmitted through the windows 708A, 708B after directly striking the windows 708A, 708B (i.e., light that has not first struck, and been reflected by, an object before striking the windows 708A, 708B). In various embodiments, the windows 708A, 708B reflect light transmitted directly from the light source 710 due to total-internal reflection ("TIR"). The thickness of the windows 708A, 708B may be, for example, 1.1 mm or between 0.1 and 0.5 mm; the windows 708A, 708B may be made from a suitable material, such as glass or a plastic, for example acrylic.

In one embodiment, a light-blocking or light-distorting substance or particle 712 is disposed on a surface of one window 708A. The substance or particle may be, for example, dust, lint, a fingerprint, oil, or any other similar material. The substance or particle 712 may interfere with the operation of the CCD 704A by blocking or distorting a light ray 714 that would have otherwise struck the CCD 704A (or would have struck it without distortion). In one embodiment, the presence of the substance or particle 712 is detected and a message is sent to a user (via, for example, the display 208) to inform the user of its presence.

In one embodiment, images are captured from both cameras 702A, 702B and analyzed by a window module 224 (with reference to FIG. 2). The window module 224 compares the images taken from both cameras 702A, 702B for inconsistencies therebetween; if, for example, an area of an image captured by the first camera 702A appears blurry and the corresponding area in an image captured by the second camera 702B is not blurry, the window module 224 may alert the user as to the presence of the substance or particle 712. Other algorithms and techniques for comparing two images, such as sum of absolute differences, are within the scope of the present invention.

In another embodiment, the window module 224 may receive two sets of images from the camera 702A: a first set of one or more images taken while the light source 710 is emitting light and a second set of one or more images take while the light source 710 is not emitting light. The window module 224 may communicate with the camera 702A and light source 710 via the device interface 216 to control both devices. In one embodiment, the substance or particle 712 is illuminated by the light source 710 (in addition to illumination from any ambient light already present in the environment of the window 708A) while the light source 710 is emitting light; when the light source 710 is not emitting light, the substance or particle 714 is illuminated only by the ambient light, if any. By comparing the two sets of images, the window module 224 detects the substance or particle 714, if present, by searching for an illuminated portion of one of the images in the first set that is not illuminated in the second set.

Figure 8A:
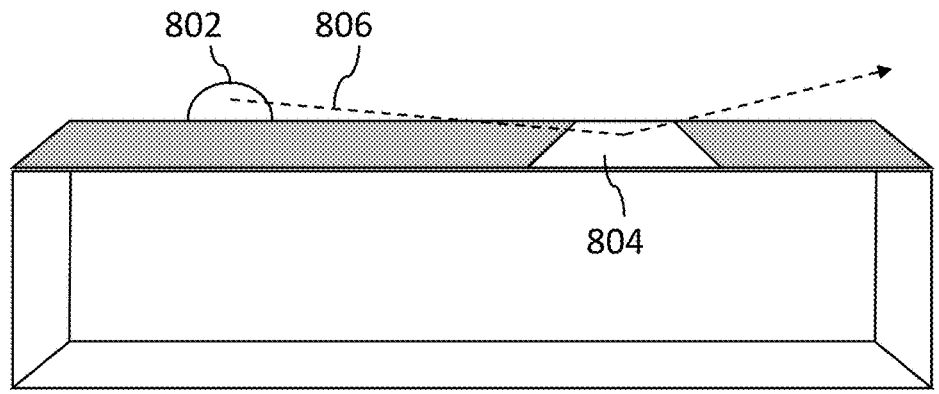
FIGS. 8A, 8B AND 8C illustrate examples in which light emitted from a light source is prevented from being transmitted through a window.
Figure 8B:
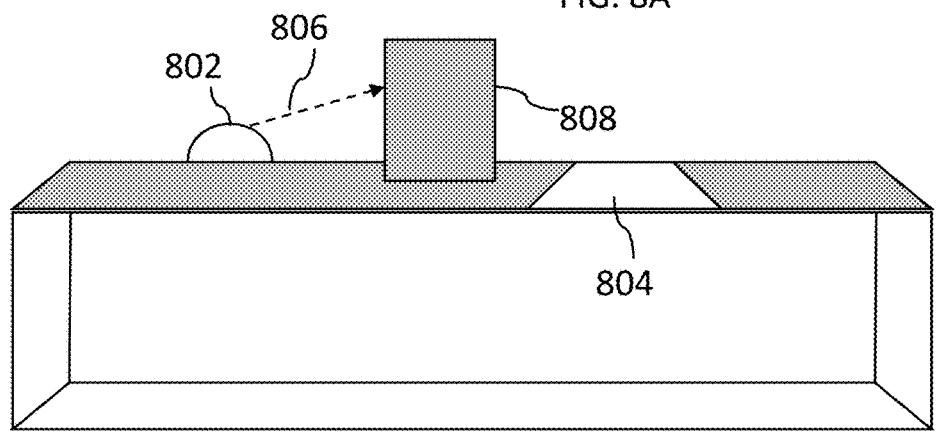
Figure 8C:
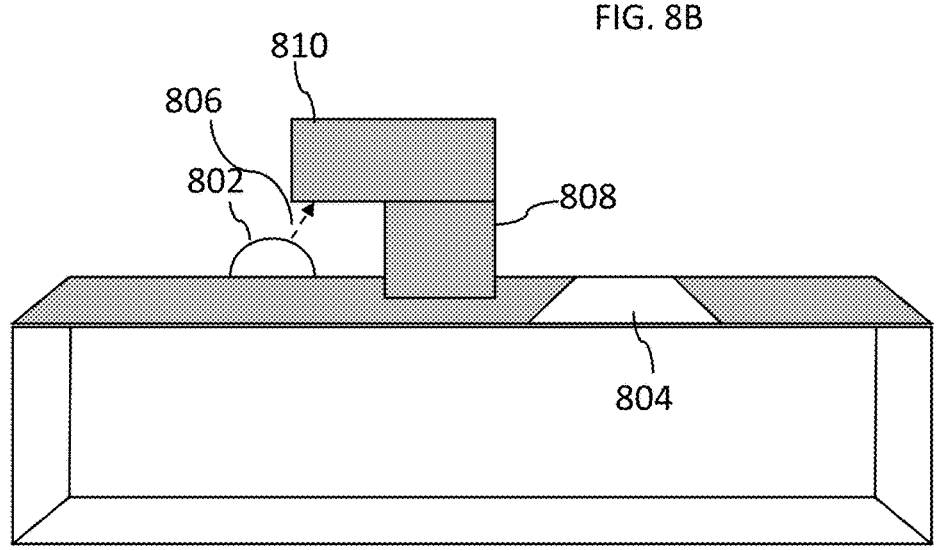

FIGS. 8A-8C illustrate exemplary embodiments of the invention in which light emitted from a light source 802 is prevented from being transmitted through a window 804 after directly striking the window 804. In FIG. 8A, the emitted light 806 reflects from the window 804 due to, for example, total-internal reflection. The material comprising the window and/or the thickness of the window may be selected such that the angle of the light 806 striking the window 804 falls within angles at which the window 804 reflects the light 806. In FIG. 8B, a protrusion 808 blocks the light 806 emitted from the light source 802, thereby preventing the light 806 from striking the window 804. In FIG. 8C, the protrusion 808 includes an overhanging portion 810 that overhangs a portion of the light source 802.

Embodiments may employed in a variety of application areas, such as for example and without limitation consumer applications including interfaces for computer systems, laptops, tablets, television, game consoles, set top boxes, telephone devices and/or interfaces to other devices; medical applications including controlling devices for performing robotic surgery, medical imaging systems and applications such as CT, ultrasound, x-ray, MRI or the like, laboratory test and diagnostics systems and/or nuclear medicine devices and systems; prosthetics applications including interfaces to devices providing assistance to persons under handicap, disability, recovering from surgery, and/or other infirmity; defense applications including interfaces to aircraft operational controls, navigations systems control, on-board entertainment systems control and/or environmental systems control; automotive applications including interfaces to automobile operational systems control, navigation systems control, on-board entertainment systems control and/or environmental systems control; security applications including, monitoring secure areas for suspicious activity or unauthorized personnel; manufacturing and/or process applications including interfaces to assembly robots, automated test apparatus, work conveyance devices such as conveyors, and/or other factory floor systems and devices, genetic sequencing machines, semiconductor fabrication related machinery, chemical process machinery and/or the like; and/or combinations thereof.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

There are number of embodiments of motion capture systems having different numbers of cameras 102 and light sources 104 that can benefit from the method and system described above. In one embodiment, orientation and location of objects 106 in 3D space are determined with a single camera 100 by performing two or more image captures in close succession in time. The system detects variations in the images and uses variations to extract positional information. In another embodiment, orientation and location of objects in space are determined with a single camera having a specialized sensor that captures multiple images with portions of the sensor either successively in time or at the same time. Examples of this second embodiment are disclosed in commonly owned, co-pending U.S. patent applications Ser. No.14/075,927, filed 8 November 2013, entitled Object Detection and Tracking with Reduced Error Due to Background Illumination, now US Pat. No. 9,392,196, issued 12 Nov. 2016, and Ser. No. 14/075,792, filed 8 Nov. 2013, entitled Three-Dimensional Imaging Sensors, now US Pat. No. 9,386,298, issued 5 Jul. 2016, the disclosures of which are incorporated by reference. In a further embodiment, orientation and location of objects 106 in 3D space are determined with more than one (1) camera 102. In this embodiment, cameras 102 capture two or more images at substantially the same time. The system compares features in the two images to determine structure, location, etc. of the object 106 being imaged. This technique is colloquially known as "stereo-matching". In a yet further embodiment, orientation and location of objects in space are determined with one or more cameras and two or more lights. As different lights are flashed, the shadows move around and the system detects variations in the images and uses the variations to extract positional information. In a still yet further embodiment, orientation and location of objects in space are determined with one (1) camera and one (1) light source by fitting rays from a camera to multiple points on an imaged object, then fits a model to the tips of the rays.

Certain embodiments of the present invention are described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for determining an orientation of an object in space, the method comprising:
    operating a light source including an opaque structure portion that is formed to protrude from a surface of a structure housing the light source and protruding substantially in a direction of the object, wherein the opaque structure portion is formed to be disposed within a path of light emanating from the light source housed thereby creating a shadow line that is generated by the opaque structure portion, the shadow line extending from the opaque structure portion such that light from the light source partially illuminates the object while simultaneously casting the shadow line onto the object that is being illuminated;
    capturing, using a camera, an image comprising an object intersecting the shadow line;
    analyzing the image to determine a position of the shadow line on the object;
    using the position of the shadow line, determining an orientation of the object;
    detecting a light-blocking or light-distorting substance or particle on a transparent window through which the camera receives light; and
    wherein the detecting the light-blocking or light-distorting substance or particle comprises comparing the image with a second image.

2. The method of claim 1, wherein the shadow line is created by blocking a portion of light emitted by the light source with a light blocking structure at least partially opaque to the light, the orientation of the light blocking structure being based also on a configuration and position of the light blocking structure relative to the light source.

3. The method of claim 1, wherein the light source is a light-emitting diode.

4. The method of claim 1, wherein the structure housing the light source comprises a protrusion acting as the light blocking structure.

5. The method of claim 1, wherein the structure housing the light source comprises a recess in a wall acting as the light blocking structure.

6. The method of claim 1, wherein analyzing the image comprises analyzing rows of the image to detect increases or decreases in luminescence therein.

7. The method of claim 2, further comprising moving the shadow line by moving the light source or the light blocking structure.

8. The method of claim 1, wherein the comparing the image comprises comparing the image with a second image taken with a second said camera.

9. The method of claim 1, wherein the comparing the image comprises comparing the image with a second image taken with the camera while the light source is not projecting light.

10. The method of claim 1, further comprising sending a message to a user informing the user of a presence of said light-blocking or light-distorting substance or particle.

11. The method of claim 1, further comprising preventing direct illumination of the camera by light from the light source.

12. The method of claim 11, wherein the direct illumination preventing step comprises creating, during the light source operating step, an un-illuminated region to one side of the shadow line, the camera being located within the un-illuminated region.

13. The method of claim 11, wherein the direct illumination preventing step comprises shielding the camera with a window configured to reject light transmitted directly from the light source to the window.

14. The method of claim 1, wherein the shadow line is a straight line.

15. The method of claim 1, wherein the image analyzing step further comprises:
    determining a first position of a shadow line;
    determining a second position of the shadow line;
    comparing the first position and the second position of the shadow line to detect a difference in shadow line position; and
    determining that the orientation of the object has changed based at least in part upon detecting the difference between the first position of the shadow line and the second position of the shadow line.

16. A light blocking/distorting detection method, for use with a system using at least one camera to image an object in space, comprising:
    illuminating an object in space by operating a light source including an opaque structure a portion that is formed to protrude from a surface of a structure housing the light source and protruding substantially in a direction of the object, wherein the opaque structure portion is formed to be disposed within a path of light emanating from the light source housed thereby creating a shadow line extending from the light source such that light from the light source to partially illuminates the object while simultaneously casting the shadow line of the opaque structure onto the object that is being illuminated;

capturing, using a camera, an image of at least a portion of the object;

detecting a light-blocking or light-distorting substance or particle on a transparent window through which the camera receives light;

wherein the detecting the light-blocking or light-distorting substance or particle comprises comparing the image with a second image; and sending a message to a user to inform the user of a presence of said light-blocking or light-distorting substance or particle.

17. The method of claim 16, wherein comparing the image comprises comparing the image with a second image taken with a second said camera.

18. The method of claim 16, wherein:

illuminating the object comprises operating a light source which projects light towards the object; and comparing the image comprises comparing the image with a second image taken with the camera while the light source is not projecting light.

19. The method of claim 16, further including detecting a transparency imperfection in a window through which a camera receives light, comprising:

capturing a first image with the camera;

capturing a second image with a second camera;

comparing the first image to the second image to detect a blurry region in the first image corresponding to transparency imperfection in a window through which the camera receives light; and alerting a user to presence of the transparency imperfection.

20. The method of claim 19, wherein the transparency imperfection is a light-blocking or light-distorting substance or particle.

21. A method for detecting a transparency imperfection in a window through which a camera receives light, the method comprising:

capturing a first image with the camera while a light source near the camera is emitting light; wherein light source includes an opaque structure portion that is formed to protrude from a surface of a structure housing the light source, wherein protrusion is substantially in direction of an object being illuminated, and is disposed within a path of light emanating from the light source to create a shadow line extending from the light source to partially illuminate an object with the shadow line of the opaque structure comprising a portion of a structure housing the light source on the object;

capturing a second image with the camera while the light source is not emitting light;

comparing the first image to the second image to detect an illumination of a transparency imperfection in a window through which the camera receives light; and alerting a user to presence of the transparency imperfection.

22. The method of claim 21, wherein the transparency imperfection is a light-blocking or light-distorting substance or particle.

23. The method claim 8, further comprising sending a message to a user informing the user of a presence of said light-blocking or light-distorting substance or particle.

24. The method claim 9, further comprising sending a message to a user informing the user of a presence of said light-blocking or light-distorting substance or particle.

* * * * *